(12) United States Patent
Eddaoudi et al.

(10) Patent No.: US 10,675,608 B2
(45) Date of Patent: Jun. 9, 2020

(54) FABRICATION OF METAL ORGANIC FRAMEWORK MATERIALS USING A LAYER-BY-LAYER SPIN COATING APPROACH

(71) Applicant: King Abdullah University of Science and Technology, Thuwal (SA)

(72) Inventors: Mohamed Eddaoudi, Thuwal (SA); Osama Shekhah, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 145 days.

(21) Appl. No.: 15/509,791

(22) PCT Filed: Sep. 10, 2015

(86) PCT No.: PCT/US2015/049402
§ 371 (c)(1),
(2) Date: Mar. 8, 2017

(87) PCT Pub. No.: WO2016/040616
PCT Pub. Date: Mar. 17, 2016

(65) Prior Publication Data
US 2017/0246615 A1 Aug. 31, 2017

Related U.S. Application Data

(60) Provisional application No. 62/049,335, filed on Sep. 11, 2014.

(51) Int. Cl.
*B05D 3/12* (2006.01)
*B01J 20/22* (2006.01)
(Continued)

(52) U.S. Cl.
CPC ......... *B01J 20/226* (2013.01); *B01J 20/3071* (2013.01); *B01J 20/3204* (2013.01);
(Continued)

(58) Field of Classification Search
CPC ..... B05D 1/005; B01J 20/226; B01J 20/3236; B01J 20/3204; B01J 20/3208;
(Continued)

(56) References Cited

U.S. PATENT DOCUMENTS 6,251,487 B1 * 6/2001 Yonaha ............... B05C 11/08
427/240
2012/0129684 A1 * 5/2012 Vimont ............ B01D 53/8628
502/170
(Continued)

FOREIGN PATENT DOCUMENTS

WO 2012/163854 12/2012

OTHER PUBLICATIONS

Arslan, et al., "Intercalation in Layered MetalOrganic Frameworks: Reversible Inclusion of an Extended π-System", Journal of the American Chemical Society, 2011,133: p. 8158-8161.
(Continued)

*Primary Examiner* — Kirsten Jolley
(74) *Attorney, Agent, or Firm* — Billion & Armitage; Lisbeth C. Robinson

(57) ABSTRACT

Embodiments describe a method of depositing an MOF, including depositing a metal solution onto a substrate, spinning the substrate sufficient to spread the metal solution, depositing an organic ligand solution onto the substrate and spinning the substrate sufficient to spread the organic ligand solution and form a MOF layer.

19 Claims, 4 Drawing Sheets

(51) Int. Cl.
| | |
|---|---|
| *B01J 20/32* | (2006.01) |
| *C07F 1/00* | (2006.01) |
| *C07F 3/00* | (2006.01) |
| *B01J 20/30* | (2006.01) |
| *B05D 1/00* | (2006.01) |
| *B01D 53/02* | (2006.01) |

(52) U.S. Cl.
CPC ....... *B01J 20/3208* (2013.01); *B01J 20/3236* (2013.01); *B01J 20/3265* (2013.01); *B01J 20/3272* (2013.01); *C07F 1/005* (2013.01); *C07F 3/003* (2013.01); *B01D 53/02* (2013.01); *B01D 2253/204* (2013.01); *B05D 1/005* (2013.01)

(58) Field of Classification Search
CPC ... B01D 2253/204; B01D 53/02; C07F 1/005; C07F 3/003
USPC ........................................................ 427/240
See application file for complete search history.

(56) References Cited

U.S. PATENT DOCUMENTS

| | | | | |
|---|---|---|---|---|
| 2014/0326007 | A1* | 11/2014 | Dinca | C07F 3/06 62/112 |
| 2015/0246318 | A1* | 9/2015 | Jeong | B01D 53/228 427/595 |

OTHER PUBLICATIONS

Decher, "Fuzzy Nanoassemblies:Toward Layered Polymeric Multicomposites", Science, vol. 277, Aug. 29, 1997, www.sciencemag.org.

Evans, et al., "Self-Assembled Multilayers of w-Mercaptoalkanoic", J. Am. Chem. SOC.1 991, 113, 5866-5868.

Ferey, et al., "Hybrid porous solids: past, present, future", Chem. Soc. Rev., Sep. 2008, 37, 191-214.

Izquierdo, et al., "Dipping versus Spraying: Exploring the Deposition Conditions for Speeding Up Layer-by-Layer Assembly", Langmuir, Jun. 2005, 21, 7558-7567.

Kitagawa, et al., "Functional Porous Coordination Polymers", Angew. Chem. Int. Ed. 2004, 43, 2334-2375.

Lu, et al., "Au Nanoparticle-based Multilayer Ultrathin Films with Covalently Linked Nanostructures: Spraying Layer-by-layer Assembly and Mechanical Property Characterization", Chem. Mater. Dec. 2006, 18, 6204-6210.

Michel, et al., "DepositionMechanisms in Layer-by-Layer or Step-by-Step DepositionMethods: From Elastic and Impermeable Films to SoftMembranes with Ion Exchange Properties", International Scholarly Research Network, ISRN Materials Science, vol. 2012, Article ID 701695, 13 pages, doi:10.5402/2012/701695.

Mueller, et al., "Metal-organic frameworks—prospective industrial applications", J. Mater. Chem., Nov. 2005, 16, 626-636.

Munuera, et al., "The controlled growth of oriented metal-organic frameworks on functionalized surfaces as followed by scanning force microscopy", Phys. Chem. Chem. Phys., Oct. 2008, 10, 7257-7261.

Olexandra, et al., "A novel method to measure diffusion coefficients in porous metal-organic frameworks", Phys. Chem. Chem. Phys., Jun. 2010, 12, 8092-8097.

Schlenoff, et al., "Sprayed Polyelectrolyte Multilayers", Langmuir, Nov. 2000, 16, 9968-9969.

Shekhah, et al., "Fabrication and non-covalent modification of highly oriented thin films of a zeolite-like metal-organic framework (ZMOF) with rho topology", CrystEngComm, www.rsc.org/crystengcomm, The Royal Society of Chemistry, Sep. 2014.

Shekhah, "Layer-by-Layer Method for the Synthesis and Growth of Surface Mounted Metal-Organic Frameworks (SURMOFs)", Materials, Feb. 2010, 3(2), 1302-1315; doi:10.3390/ma3021302.

Shekhah, et al., "MOF thin films: existing and future applications", Chem. Soc. Rev., 2011, 40, 1081-1106.

Shekhah, et al., "Post-synthetic modification of epitaxially grown, highly oriented functionalized MOF thin films", www.rsc.org/chemcomm, DOI: 10.1039/c1cc12543e, Chemical Communications—Sep. 2011.

Shekhah, et al., "Step-by-Step Route for the Synthesis of Metal-Organic Frameworks", J. Am. Chem. Soc. Nov. 2007, 129, 15118-15119.

Shekhah, et al., "The liquid phase epitaxy approach for the successful construction of ultra-thin and defect-free ZIF-8 Membranes: Pure and mixed gas transport study.", Chemical Communications, 2014, 17, 50: p. 2089-2092.

Uemura, et al., "Flexible microporous coordination polymers", Journal of Solid State Chemistry 178, Jul. 2005, 2420-2429.

Vozar, et al., "Automated spin-assisted layer-by-layer assembly of nanocomposites", Rev Sci Instrum. Feb. 2009; 80 (2): 023903.

Wang, et al., "Nanoporous Designer Solids with Huge Lattice Constant Gradients: Multi-heteroepitaxy of Metal-Organic Frameworks", Nano Letters, Manuscript ID: nl-2013-04767k, Dec. 2013.

Yaghi, et al., "Reticular synthesis and the design of new materials", Nature, vol. 423, Jun. 12, 2003, www.nature.com/nature.

Zacher, et al., "Thin films of metal-organic frameworks", Chem. Soc. Rev., Mar. 2009, 38, 1418-1429.

"International Search Report and Written Opinion", International Application No. PCT/US2015/049402, Dec. 10, 2015, 10 pages.

Keitz, et al., "Lithographic deposition of paatterned metal-organic framework coatings using a photobase generator", Angewandte Chemie International Edition, vol. 53, No. 22, May 26, 2014, 5561-5565.

Extended European Search Report for EP Application No. 19174656.9 dated Jul. 29, 2019.

* cited by examiner

FABRICATION OF METAL ORGANIC FRAMEWORK MATERIALS USING A LAYER-BY-LAYER SPIN COATING APPROACH

CROSS REFERENCE TO RELATED APPLICATION

This application claims benefit of U.S. Provisional Application No. 62/049,335, filed on 11 Sep. 2014 and which application is incorporated herein by reference. A claim of priority is made.

BACKGROUND

Many applications including sensing and membranes rely on efficient and reliable methods for fabricating porous materials thin films. Generally, porous thin films can be fabricated by attaching porous material to a surface, such as a functionalized substrate. It is critical that porous thin film fabrication methods be robust, and capable of generating homogeneous films with well-defined thicknesses. In some cases, a high degree of orientation can be beneficial. Metal-organic frameworks (MOFs) are a new class of crystalline porous materials, which are very well suited for use as surface-modifying coatings. The adaptation of specific functions to MOF thin films can be achieved either by loading deposited MOF with functional molecules or by through a post-functionalizing modification of the MOF-constituents.

Liquid phase epitaxy (LPE) fabrication processes (or layer-by layer methods) can be used to obtain crystalline, highly oriented MOFs layers on substrates. Substrates can include modified Au-substrates, also referred to as SUR-MOFs. A major drawback of this LPE method, however, is that the sequential deposition process is time consuming and tedious. For example, an LPE method can require 400 separate immersion cycles to fabricate a film 100 layers (i.e., ~100 nm) thick. Such a process can take approximately 3 days, and further consume large quantities of chemicals and solvents. These drawbacks preclude the use of MOFs from applications which require thicker and/or mechanically strong layers, such as membranes, storage, and small molecule separation (e.g., gas phase chromatography, liquid phase chromatography) where a thickness of at least a 1 µm can be required.

Spray methods can be used to fabricate MOFs at speeds which are two orders of magnitudes faster than LPE fabrication processes. The spray method utilizes a nozzle system which deposits the reactant's solutions and solvents required for the MOF thin film growth onto a targeted surface (i.e., a substrate) in a form of aerosol. The aerosol droplets, having sizes down to about 10 µm, impinge on the substrate and coat the surface with a thin film of the desired reactant. The reactant, either a metal precursor or an organic ligand, deposits at the solid/liquid interface in a similar fashion as with the LPE process. The coated surface is next sprayed with solvent to remove unreacted material. However, nozzle limitations make it difficult to apply a homogenous coating, and the process consumes a large amount of chemicals and solvents, thereby making the process prohibitively inefficient at larger scales.

SUMMARY

Embodiments describe a method of depositing an MOF, including depositing a metal solution onto a substrate, spinning the substrate sufficient to spread the metal solution, depositing an organic ligand solution onto the substrate and spinning the substrate sufficient to spread the organic ligand solution and form a MOF layer.

DETAILED DESCRIPTION

Figure 1:
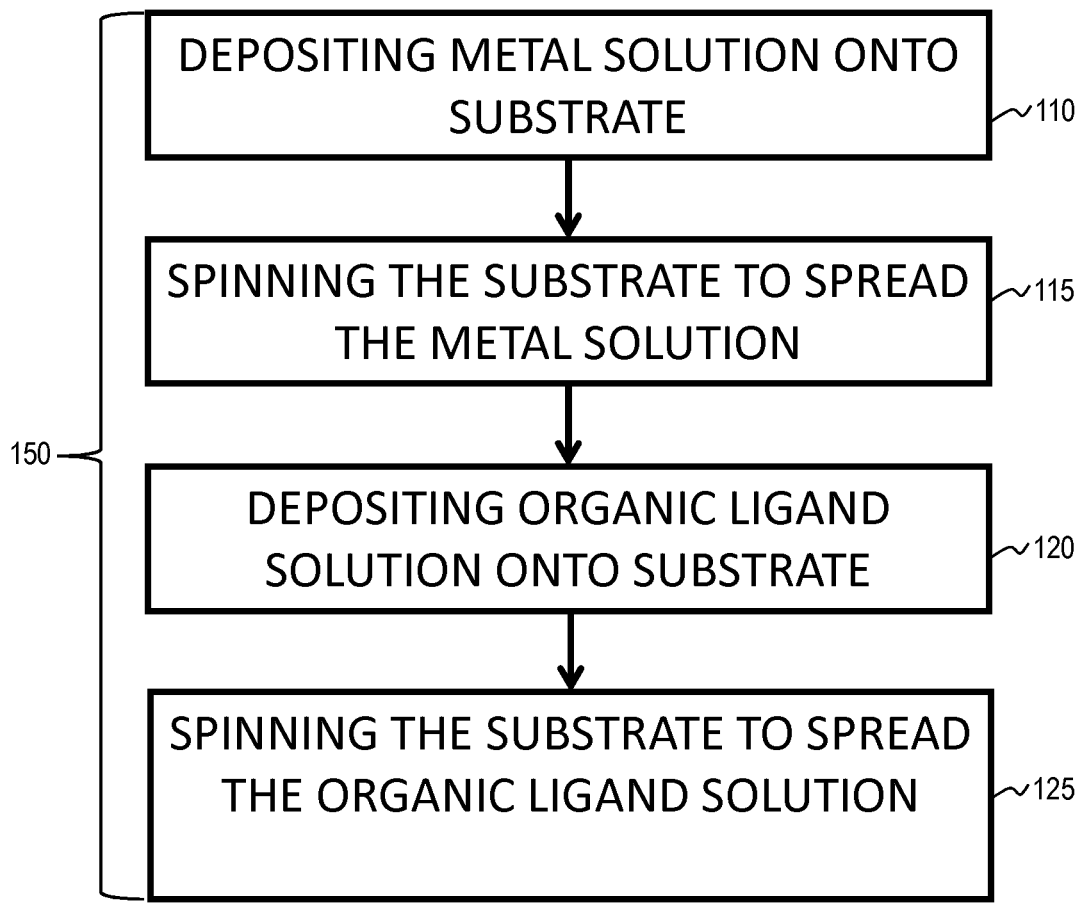
FIG. 1 illustrates a block flow diagram of a method of depositing a layer of MOF on a substrate, according to one or more embodiments.

Described herein are novel spin coating methods for fabricating highly oriented and crystalline coatings of highly porous metal-organic frameworks (MOFs) on various solid substrates. The methods are capable of producing homogeneous MOF films with controllable thicknesses, and are based on adapting LPE synthesis to spin coating. Such spin coating methods not only can provide significantly higher output as compared to LPE and dipping processes, but also dramatically decrease the consumption of chemicals and solvents, which make them more economically feasible for industrial application. Through applying this new approach, it is possible to fabricate thick (µm) layers of several types of MOFs, including $Cu(bdc)_2.xH_2O$, $Zn(bdc)_2.xH_2O$, HKUST-1 and ZIF-8, on various substrates like functionalized Au and aluminum oxide substrates.

Metal organic framework materials (MOFs) are crystalline materials composed of both inorganic and organic components in a porous networked structure. Metal organic framework materials exhibit exceptionally high specific surface area, in addition to tunable pore size and functionality, which make them attractive in many applications, including gas storage, gas separation, catalysis, drug delivery, light-emitting devices, and sensing.

MOFs can be applied in gas storage for hydrogen and hydrocarbons, gas separation, gas sensors and catalysis. MOFs can include metal cations $M^{n+}$ (n=2, 3) and functionalized polytopic organic ligands. MOFs have cavities and/or channels readily available for adsorption of guest molecules, embedding of nano-clusters or more generally for anchoring various functional species to match the pore size in the scaffold. One theme of this chemistry is the rational design and precise control of the formation of the respective network.

Metal-organic frameworks (MOFs) can be made by linking inorganic and organic units by strong bonds. The flexibility with which the constituents' geometry, size, and functionality can be varied can lead to many different MOFs. The organic units can be ditopic, polytopic organic carboxylates (and other similar negatively charged molecules), which, when linked to metal-containing units, can yield architecturally robust crystalline MOF structures with a porosity of greater than 50% of the MOF crystal volume. The surface area values of such MOFs can range from 1000 to 10,000 m$^2$/g, thus exceeding those of traditional porous materials such as zeolites and carbons. To date, MOFs with permanent porosity are more extensive in their variety and multiplicity than many other classes of porous materials. These aspects have made MOFs ideal candidates for storage of fuels (hydrogen and methane), capture of carbon dioxide, and catalysis applications, to mention a few.

The use of MOFs as powder materials is evident, but the integration of MOFs as novel building blocks and functional units for bottom-up nanotechnology requires precise control over the process of crystallization of MOFs on surfaces. Smart membranes, catalytic coatings, chemical sensors, and many other related nanotechnology applications depend on the production of controlled thin films and coatings with well-defined porosity, chemical composition, and tunable functionality. Zeolites, MOFs, organic polymers, metal oxides and activated carbon can be used. The growth of thin MOF films can use an in-situ crystallization method on surfaces, in particular of MOF-5, HKUST-1 and many other MOFs. Oriented MOF thin films can be anchored from mother liquor solution as a function of the surface functional groups of self-assembled monolayers (SAMs) (COOH and OH, respectively) for different types of MOFs.

Layer-by-layer (or Liquid phase epitaxy) method can be used to grow thin MOF layers. For example, HKUST-1 MOF can be grown using LBL method on metal surfaces functionalized with SAMs, specifically to steer and control the growth orientation.

The spin-coating approach offers a platform for depositing uniform thin films to substrates that can be tuned easily and used. The method can be easily automated using the available spin coating commercial devices. Inorganic, organic components and solvents are tunable, which permits facile alteration of MOF layers and functionality. It is also possible to scale up on different substrate sizes and there is no limitation for substrate type, such as metals, metal oxides, polymers, etc.

A method 100 for depositing a layer of MOF 110 on a substrate 105 is illustrated in FIG. 1. Method 100 can comprise depositing 110 a metal solution onto a substrate, spinning 115 the substrate to spread the metal solution, depositing 120 an organic ligand solution on the substrate, and spinning 125 the substrate to spread the organic ligand solution. The metal solution can comprise a metal ion, such as from transition metals and alkaline earth metals. The metal ion can comprise a divalent metal cation. The divalent metal cation ($M^{2+}$) can comprise Ni, Cu, Zn, Mn, Cd and Co. The metal ion can comprise a trivalent metal cation. The trivalent metal cation ($M^{3+}$) can comprise Fe, and Al, for example. The organic ligand solution can include polytopic ligands, such as ditopic ligands. Examples include terephthalic acid and its derivatives, such as amino, nitro, and hydroxyl. Other examples include dabco, bipyridine, and pyrazine. Further examples include trivalent embodiments, such as trimesic acid and many other polytopic ligands. The substrate can include alumina, titanium oxide, polymer, copolymer, carbon, metal, or metal oxides.

Depositing 110 and depositing 120 can be accomplished using a syringe, such as a micro syringe, to deposit a drop, such as a micro-drop. A small amount of coating material can be deposited on the center of the substrate, which is either spinning at low speed (such as around 100 rpm) or not spinning at all. The substrate can then be rotated at high speed (such as 500-6000 rpm) in order to spread the coating material by centrifugal force. A machine, such as a spin coater, can be used for spin coating.

Spinning 115 and spinning 125 can occur for an amount of time. An amount of time can be determined based on a time sufficient to spread a metal solution or an organic ligand solution thoroughly across the substrate. Spreading can occur by centrifugal force during spinning. An amount of time can be determined based on a time sufficient to for a metal solution to react with an organic ligand solution. A MOF can form on the substrate as a result of subsequent deposition of a metal solution and an organic ligand solution. One cycle 150 includes depositing 110, spinning 115, depositing 120, and spinning 125. Depositing 110 and spinning 115 can occur before or after depositing 120 and spinning 125. Multiple cycles can be repeated to generate a thicker MOF film. Spinning can be continued while the fluid spins off the edges of the substrate, until the desired thickness of the film is achieved. The applied solvent can be usually volatile, and simultaneously evaporates. So, the higher the angular speed of spinning, the thinner the film. The thickness of the film can also depend on the viscosity and concentration of the solution and the solvent, which can range from about 1-2 nm to about 300-400 nm.

Method 100 can optionally include one or more washing steps. A washing step can comprise depositing a solvent onto the substrate after spinning 115 or spinning 125. Depositing a solvent can comprise depositing a drop of solvent. Examples of solvents include ethanol, methanol, DMF and others. Solvent can optionally be deposited to remove unreacted or unadhered metal solution or organic ligand solution from the substrate. The amount of solvent deposited can depend on the amount of metal solution or organic ligand solution that needs to be removed. With a fully automated spin coating machine, a micro-drop of a metal solution using a micro syringe is placed on the substrate for a certain time, which is rotated at high speed in order to spread the fluid by centrifugal force.

EXAMPLE 1

Spin Coating Fabrication of $M_2(CH_3COO)_4.H_2O$ (M=Cu, Zn) MOFs $Cu_2(bdc)_2.xH_2O$ and $Zn_2(bdc)_2.xH_2O$ MOFs were grown on gold substrates (200-nm Au/2-nm Ti evaporated on Si wafers) that were at first functionalized by self-assembled monolayers SAMs of 16 mercaptohexadecanoic acid MHDA. These substrates were then placed on a vacuum chuck and subsequently spin coated with 50 μl of a 1 mM $M_2(CH_3COO)_4.H_2O$ (M=Cu, Zn) ethanol solution for 5 seconds and then with 50 μl of a 0.1 mM BDC solution for 5 seconds at room temperature. Critical parameters of the spin coating procedure are spin coating speed (500 rpm), spinning time and injection volume. Typical values of these parameters are 800 rpm, 5 seconds, and 50 μl, respectively. Between each step the substrates were washed with solvent. After a careful optimization of the time, concentration, and spinning speed, it was found that the time needed to deposit 100 cycles of thin film took only 50 minutes, as compared to the 72 hours required by the conventional layer-by-layer process and 30 minutes compared to the spray method. While the spin coating method produced a film of equal thickness to a film produced by a spray method over a number of cycles (i.e. 200 nm for 10 cycles), the spin coating method used less solution and further offers the possibility to easily coat larger surfaces. The spin coated films were found to be very stable upon drying and removing of the solvent—both on the macro and micro scale and no kind of delamination was observed.

Figure 2A:
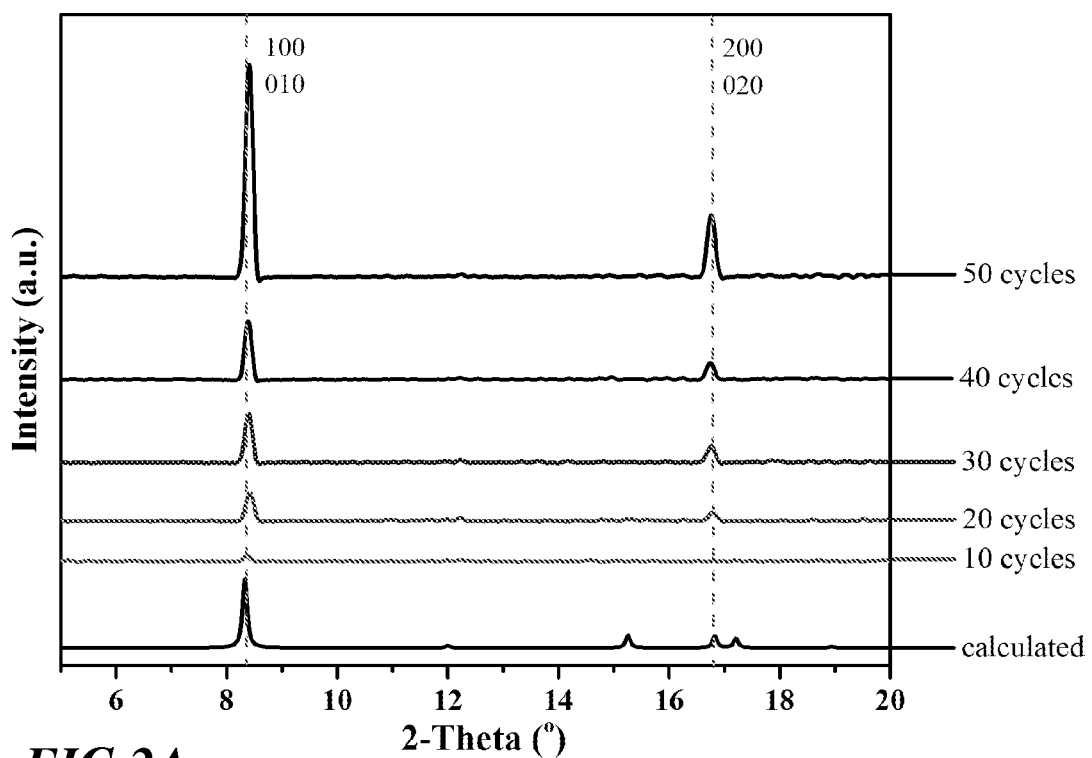
FIG. 2A illustrates out-of-plane X-ray diffraction data of a $Cu_2(bdc)_2.H_2O$ SURMOF grown on a COOH— terminated SAM after different cycles, according to one or more embodiments.

FIG. 2A illustrates out-of-plane X-ray diffraction data (background-corrected) of the $Cu_2(bdc)_2 \cdot H_2O$ SURMOF grown on a COOH— terminated SAM after different cycles. Calculated data for $Cu_2(bdc)_2 \cdot H_2O$ is shown for comparison. The diffraction peaks reveal the presence of a crystalline and highly oriented $Cu(bdc)_2 \cdot xH_2O$ film. Interestingly, although the time to grow this MOF thin film is two orders of magnitude faster than with the conventional LPE-method, the degree of orientation and ordering is comparable.

Figure 2B:
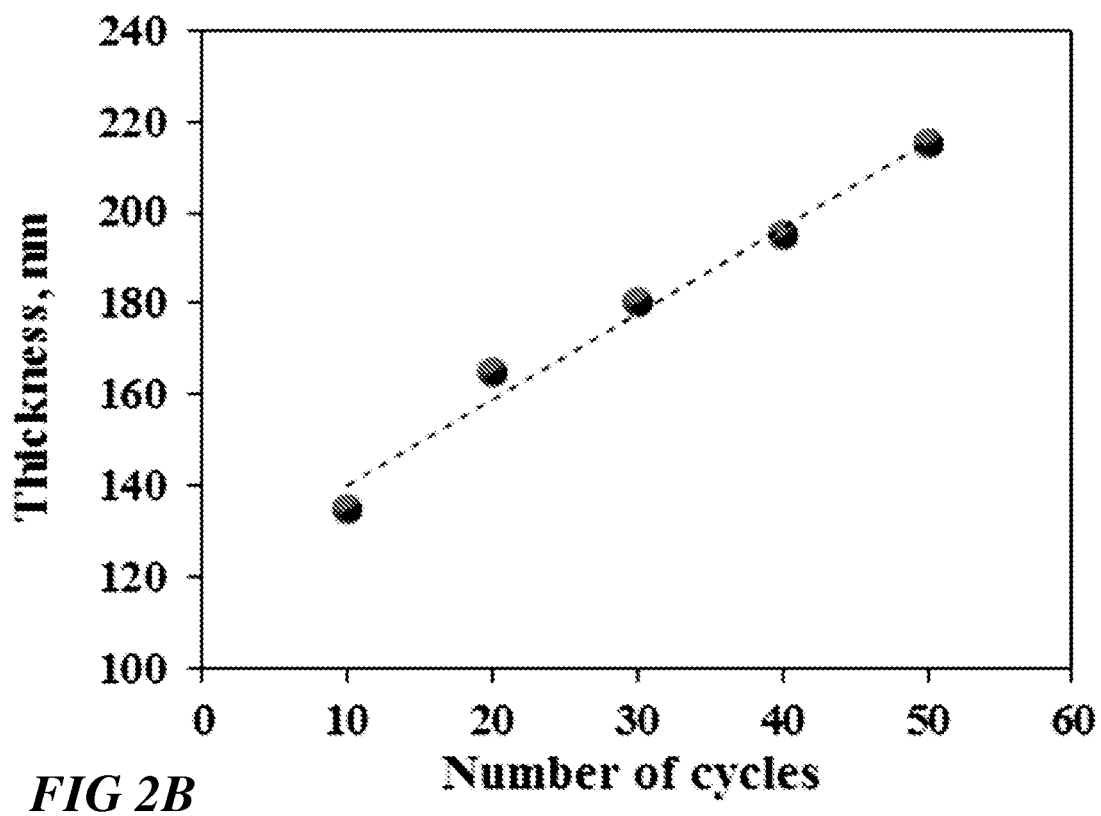
FIG. 2B illustrates a plot of a $Cu_2(bdc)_2.H_2O$ SURMOF thickness per growth cycle, according to one or more embodiments.

FIG. 2B illustrates a plot of the $Cu_2(bdc)_2 \cdot H_2O$ SURMOF thickness per growth cycle. This thickness analysis shows the increase of $Cu(bdc)_2 \cdot xH_2O$ film thickness per deposition cycle, which is much larger than film thickness achieved by LPE deposition processes. These results confirm that the spin coating methods provided herein have a much faster growth rate per cycle than LPE methods.

Figure 2C:
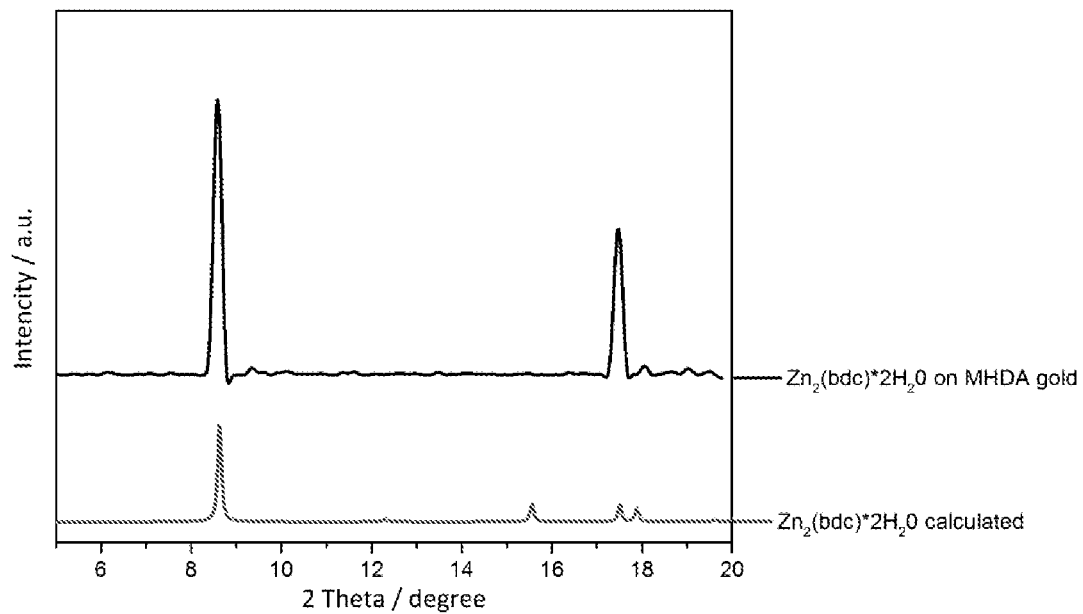
FIG. 2C illustrates out-of-plane X-ray diffraction data of a $Zn_2(bdc).xH_2O$ SURMOF grown on a COOH terminated Au-substrate, according to one or more embodiments.

FIG. 2C illustrates Out-of-plane X-ray diffraction data (background-corrected) of an $Zn_2(bdc) \cdot xH_2O$ SURMOF grown on a COOH terminated Au-substrate after 10 cycles in additional to calculated patterns.

The spin coating method was also used to grow MOF thin films on prepatterned substrates, proving the method to be highly selective. SEM images confirmed the deposition of MOF thin films only on COOH-terminated substrate regions, with negligible MOF deposition on $CH_3$-terminated substrate regions. Before deposition, the SAMs had been laterally patterned via micro-contact printing (μCP) method.

EXAMPLE 2

Spin Coating Fabrication of ZIF-8 MOFs Membrane

ZIF-8MOFs were grown on highly porous $Al_2O_3$ (Cobra Technologies BV) substrates. The support was first washed with water and ethanol and then dried at 150° C. to remove any contaminants from the surface. These substrates were then placed on a vacuum chuck and subsequently spin coated with 50 μl of a 2 mM of $Zn(NO_3)_2 \cdot 6H_2O$ methanol solution for 5 seconds and then with a 50 μl of a 2 mM of 2-Methylimidazole methanol solution for 8 seconds at room temperature. The spin coating procedure used for fabricating the $Cu_2(bdc)_2 \cdot H_2O$ MOF in Example 1 was followed.

In this example, the ZIF-8 the spin coating method was found to be much more efficient than the conventional LPE method, based on 200 growth cycles yielding a thickness of 5 μm in about 1.5 hours versus the LPE method which required 150 growth cycles to yield a thickness of 0.6 micrometer in 24 hours.

Figure 3:
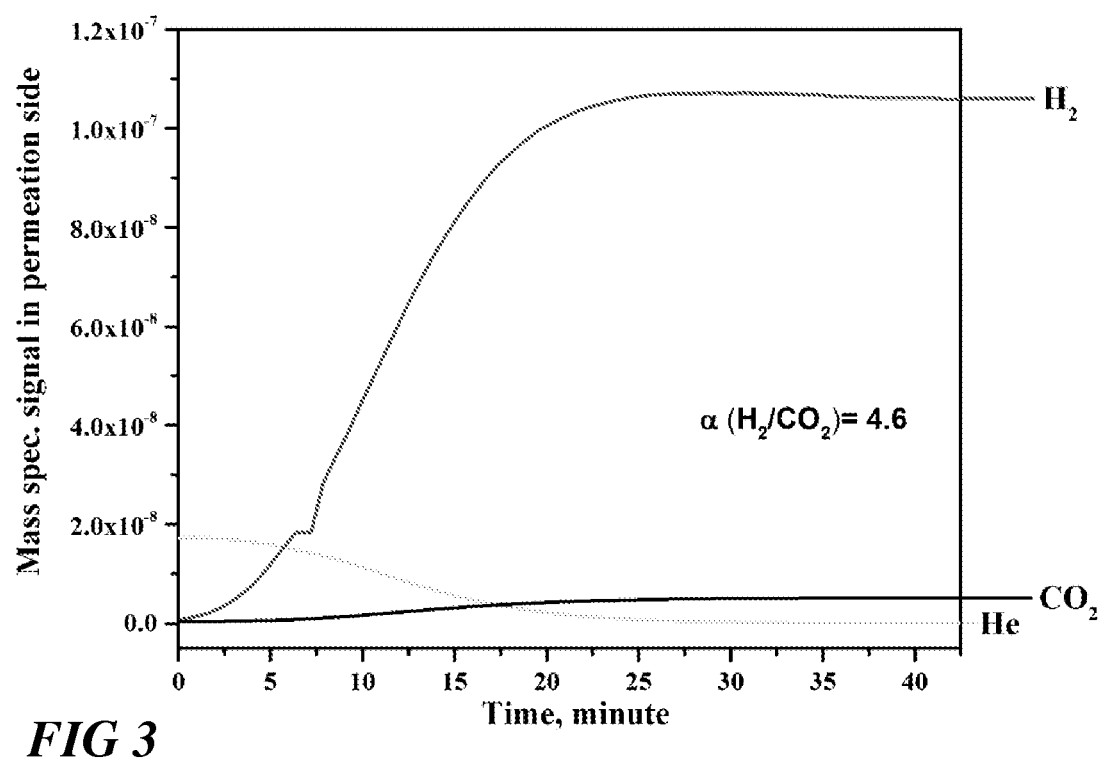
FIG. 3 illustrates the results of a gas separation study for a ZIF-8 MOF membrane, according to one or more embodiments.

FIG. 3 illustrates the results of a gas separation study, wherein the permeation of $H_2$ and $CO_2$ were tested against the ZIF-8 MOF membrane. A $CO_2/H_2$ 20/80 mixture was tested using a variable pressures-continuous permeate composition analysis technique at 308 K with 2.0 bar as a feed pressure. The variable pressure-continuous permeate composition analysis technique was used to test the gas mixture permeation for the membrane. The permeate gas composition is monitored continuously until the occurrence of the stead state. After an activation process of the membrane with He gas, the binary gas mixture with composition $a_{up}$, $b_p$ of interest is applied upstream with a maintained flux at 40-50 cc/min while monitoring the composition of the permeate downstream composition $a_{down}$, $b_{down}$. The system is considered in a steady state when no change in the signal of the MS is observed The mixture gas permeation results show that the ZIF-8 thin film shows a selectivity of about 4.6 in favor of $H_2$.

EXAMPLE 3

Spin Coating Fabrication of HKUST-1 MOFs

The HKUST-1 was grown on activated aluminum substrates (same as ZIF-8). These substrates were then placed on a vacuum chuck and subsequently spin coated with 50 μl of a 0.5 mM of $Cu_2(CH_3COO)_4 \cdot H_2O$ ethanol solution for 5 seconds and then with a 50 μl of a 0.2 mM of 1,3,5-benzenetricarboxylic acid ethanol solution for 10 seconds at room temperature. The spin coating procedure for fabricating the $Cu_2(bdc)_2 \cdot H_2O$ MOF in Example 1 was followed.

Figure 4:
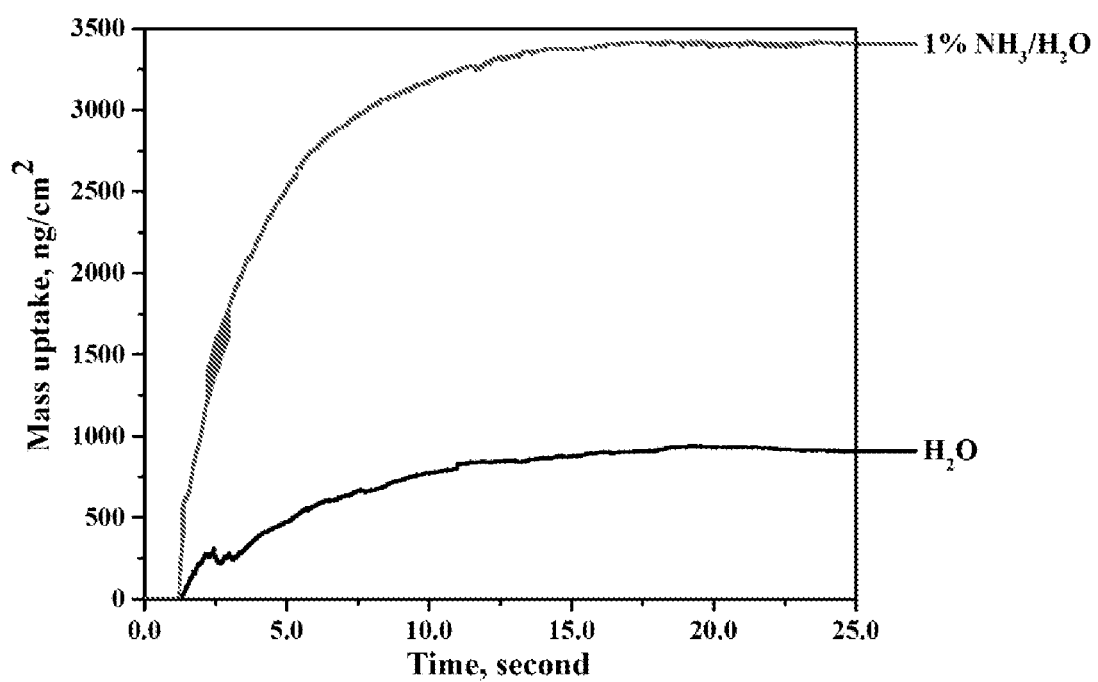
FIG. 4 illustrates a data for $NH_3$ sensing capabilities of a $Cu_2(bdc)_2.xH_2O$ MOF on QCM substrate, according to one or more embodiments.

EXAMPLE 4 Spin Coating Fabrication of $M_2(CH_3COO)_4 \cdot H_2O$ on QCM Substrates Quartz crystal microbalance (QCM) substrates were coated with $Cu_2(bdc)_2 \cdot xH_2O$ MOF using the LPE spin coating approach to test them for sensing application. The $Cu_2(bdc)_2 \cdot xH_2O$ SURMOF was spin coated over a COOH functionalized QCM substrate using the spin coating techniques as described in the previous examples. The coated $Cu_2(bdc)_2 \cdot xH_2O$ MOF on QCM substrate was tested for an ability to sense $NH_3$ in humid conditions. The mass uptake for the pure $H_2O$ feed was measured as a reference. As illustrated in FIG. 4, a slow mass uptake is observed. However, in case of the 1% $NH_3$ in water solution, a very rapid uptake was observed on the QCM, which indicates the high selectivity of this MOF for the $NH_3$ gas. Despite its similar size, $NH_3$ showed much faster uptake due to its capability to coordinate stronger to the $Cu^{2+}$ atoms of the $Cu_2(bdc)_2 \cdot xH_2O$ MOF framework.

Embodiments of the present invention include, at least the following:

Embodiment 1. A method of depositing a MOF, comprising:
  depositing a metal solution onto a substrate;
  spinning the substrate, sufficient to spread the metal solution;
  depositing an organic ligand solution onto the substrate; and
  spinning the substrate, sufficient to spread the organic ligand solution and form a MOF layer.

2. The method of embodiment 1, wherein the metal solution comprises a metal ion or cluster.

3. The method of embodiment 2, wherein the metal ion comprises a divalent metal cation, trivalent metal cation, clusters of a divalent or trivalent metal ions, or combinations thereof.

4. The method of embodiment 1, wherein the organic ligand solution comprises polytypic ligands.

5. The method of embodiment 1, wherein the organic ligand solution comprises one or more of terephthalic acidacid, trimesic acid, dabco, bipyridine, and pyrazine.

6. The method of embodiment 1, wherein the substrate comprises alumina, titanium oxide, polymer, copolymer, carbon, metal, or a metal oxide.

7. The method of embodiment 1, wherein depositing comprises using a syringe to deposit one or more drops.

8. The method of embodiment 1, wherein spinning comprises two or more constant speeds.

9. The method of embodiment 1, further comprising one or more cycles of depositing a metal solution and spinning
10. The method of embodiment 1, further comprising one more cycles of depositing an organic ligand solution and spinning.
11. The method of embodiment 1, further comprising washing after spinning.
12. The method of embodiment 11, wherein washing comprises contacting with a solvent.
13. The method of embodiment 1, wherein the organic ligand solution comprises two or more different polytopic ligands.
14. The method of embodiment 1, further comprising controlling the thin film thickness and orientation.

What is claimed is:

1. A method of depositing a Metal-Organic Framework (MOF), comprising:
   performing at least two spin-coating cycles using a fully automated spin-coating machine equipped with microsyringes, wherein a spin-coating cycle consists essentially of:
     depositing a microdrop of metal solution onto a substrate from a first microsyringe;
     spinning the substrate at 500-6000 rpm for a time sufficient to spread the metal solution;
     washing the substrate with solvent;
     depositing a microdrop of an organic ligand solution onto the substrate from a second microsyringe;
     spinning the substrate at 500-6000 rpm for 5-10 seconds, whereby the metal solution reacts with the organic ligand solution to form a MOF layer with a thickness within a range of 2 nm to about 300 nm; and
     washing the substrate with solvent;
   wherein the substrate is spinning at about 100 rpm or is not spinning when the metal solution, the organic ligand solution, or both the metal and organic ligand solutions are deposited;
   wherein the metal solution comprises metal ions selected from the group consisting of divalent metal ions and trivalent metal ions;
   wherein the organic ligand solution comprises at least one ditopic or tritopic organic ligand.

2. The method of claim 1, wherein the organic ligand solution comprises one or more of 1,4-benzenedicarboxylic acid (terephthalic acid), 1,3,5-benezenetricarboxylic acid (trimesic acid), 1,4-diazabicyclo[2.2.2]octane (dabco), 2-Methylimidazole, bipyridine, and pyrazine.

3. The method of claim 1, wherein the substrate comprises alumina, titanium oxide, polymer, copolymer, carbon, metal, or a metal oxide.

4. The method of claim 3, wherein the substrate is porous alumina.

5. The method of claim 4, wherein the metal solution comprises Zn ions, the organic ligand solution comprises 2-Methylimidazole, and the MOF layer formed is a Zeolite Imidazolate Framework number 8 (ZIF-8) MOF layer.

6. The method of claim 4, wherein the metal solution comprises Cu ions, the organic ligand solution comprises 1,3,5-benezenetricarboxylic acid, and MOF layer formed is a Hong Kong University of Science and Technology number 1 (HKUST-1) MOF layer.

7. The method of claim 3, wherein the substrate includes gold functionalized with self-assembled monolayers.

8. The method of claim 7, further comprising functionalizing the substrate with self-assembled monolayers consisting of 16-mercaptohexadecanoic acid before performing the first spin-coating cycle.

9. The method of claim 8, wherein a portion of the substrate is pre-patterned with self-assembled monolayers.

10. The method of claim 3, wherein the metal ions are selected from the group consisting of Fe, Al, Cu, Ni, Zn, Mn, Cd and Co ions and the ditopic or tritopic organic ligand is selected from the group consisting of terephthalic acid, trimesic acid, dabco, 2-Methylimidazole, and bipyridine.

11. The method of claim 1, further comprising washing and drying the substrate before performing the first spin-coating cycle.

12. The method of claim 5, wherein 10 to 200 cycles of spin-coating are performed.

13. The method of claim 12, wherein performing 200 cycles produces a ZIF-8MOF film on the substrate with a thickness of 5 µm.

14. The method of claim 12, wherein performing 200 cycles requires about 1.5 hours.

15. The method of claim 9, wherein 10 to 100 cycles of spin-coating are performed.

16. The method of claim 15, wherein performing 100 cycles requires 50 minutes.

17. The method of claim 1, wherein the substrate is spinning at about 100 rpm when both the metal and organic ligand solutions are deposited.

18. The method of claim 1, wherein the organic ligand solution comprises two or more different ditopic or tritopic organic ligands selected from the group consisting of terephthalic acid, 2-Methylimidazole, trimesic acid, dabco, bipyridine, and pyrazine.

19. The method of claim 1, wherein the substrate is spun at a speed of 500-800 rpm after deposition of the metal solution and after deposition of the organic ligand solution.

* * * * *